United States Patent
Sakai et al.

(10) Patent No.: US 7,489,378 B2
(45) Date of Patent: Feb. 10, 2009

(54) LIQUID CRYSTAL DISPLAY DEVICE

(75) Inventors: Aki Sakai, Mobara (JP); Noboru Kunimatsu, Chiba (JP); Hidehiro Sonoda, Mobara (JP); Shigeru Matsuyama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 223 days.

(21) Appl. No.: 11/645,064

(22) Filed: Dec. 26, 2006

(65) Prior Publication Data

US 2007/0148369 A1 Jun. 28, 2007

(30) Foreign Application Priority Data

Dec. 26, 2005 (JP) ............... 2005-371409
Dec. 5, 2006 (JP) ............... 2006-328070

(51) Int. Cl.
*G02F 1/1337* (2006.01)

(52) U.S. Cl. ..................................... 349/128
(58) Field of Classification Search ............ 349/128
See application file for complete search history.

(56) References Cited

U.S. PATENT DOCUMENTS 7,133,099 B2 * 11/2006 Yoshida et al. .............. 349/129

* cited by examiner

*Primary Examiner*—David Nelms
*Assistant Examiner*—Phu Vu
(74) *Attorney, Agent, or Firm*—Reed Smith LLP; Stanley P. Fisher, Esq.; Juan Carlos A. Marquez, Esq.

(57) ABSTRACT

In a liquid crystal display device using a photodecomposition type light orientation film, the deterioration of display performance due to an impurity resulting from a light orientation treatment of the orientation film is suppressed to enable high-quality image display. In the orientation film to which a liquid crystal orientation function is provided, the amount of decomposition product due to the orientation film is 3957.5 ng or less per 100 $cm^2$.

9 Claims, 12 Drawing Sheets

LIQUID CRYSTAL DISPLAY DEVICE

The present application claims priority from Japanese application JP2005-371409 filed on Dec. 26, 2005 and Japanese application JP2006-328070 filed on Dec. 5, 2006, the content of which is hereby incorporated by reference into this application.

BACKGROUND OF THE INVENTION

1. Field of the Invention

The present invention relates to a liquid crystal display device, and particularly to a liquid crystal display device in which an orientation control function is provided to an orientation film by light irradiation.

2. Description of the Related Art

As a method of performing an orientation treatment, that is, providing an orientation control function to an orientation film used in a liquid crystal display device, there has been a method of performing a rubbing treatment. In the orientation treatment by rubbing, the orientation film is rubbed by a cloth in a specified direction so that the orientation treatment is performed. On the other hand, as a method of providing the orientation control function to the orientation film in a non-contact manner, there is a light orientation method.

Patent document 1 discloses a technique in which an orientation film is irradiated with ultraviolet polarized light, and an excited state by a light energy reaction is used to cause a new bond formation reaction or bond cleavage reaction to occur in molecular chains of the orientation film, so that a pretilt angle and directionality are imparted to liquid crystal molecules.

[Patent document 1] JP-A-7-318942 (relevant patent: U.S. Pat. No. 5,604,615)

This kind of orientation film is formed of a coating film of polyimide resin. In the orientation film which uses polyimide resin with alkyl side chains and to which the orientation control function is provided by light orientation, the pretilt angle can be generated by inclining the irradiation direction of the polarized light relative to the substrate surface. However, in the related art, the generation amount of fine decomposition product by cutting of ultraviolet rays is not considered. The decomposition product reduces afterimage characteristics, thermal stability or electric stability and has been a factor to degrade the display performance according to the amount thereof.

Specifically, when the orientation film has an ion adsorption site, an ion in the liquid crystal repeats the adsorption to and release from the adsorption site, so that the afterimage characteristics due to a direct current component (DC) is degraded in the orientation film. When a large amount of decomposition product (short molecule component) remains in the orientation film, following phenomena are caused.

(1) Since the short molecule component has a low molecular weight, a part of the residue exceeding a specific amount dissolves in the liquid crystal, and the voltage holding ratio of the liquid crystal molecule orientation is reduced.

(2) When it is assumed that the short molecule component is something like shavings by rubbing, a large amount of the remaining component causes reduction of the elastic modulus of the surface of the orientation film.

(3) Since a large amount of the remaining short molecule component does not contribute to the orientation control, the thermal stability and electric characteristics of the orientation film are reduced.

SUMMARY OF THE INVENTION

The present invention has an object to solve the above problems and to enable a high quality image display in a liquid crystal display device using a photodecomposition type light orientation film.

The above object is achieved by causing a decomposition product (short molecule component) due to an orientation film to remain in the orientation film after a light orientation treatment. This short molecule component is the residue of the decomposition product of the orientation film generated by light irradiation.

The feature of the invention is to regulate the residual amount of the decomposition product per unit area.

A liquid crystal display device of the invention is provided with a liquid crystal display panel including a first substrate having a first orientation film on an uppermost layer of a main surface on which an active element for pixel selection is formed, a second substrate having a second orientation film on an uppermost layer of a main surface on which a color filter is formed, and a liquid crystal sealed between the first orientation film of the first substrate and the second orientation film of the second substrate.

Both the first orientation film and the second orientation film are provided with a liquid crystal orientation function by light irradiation, and the orientation film provided with the liquid crystal orientation function contains a specified amount of short molecule component due to the orientation film.

The short molecule component is the decomposition product of the orientation film generated by the light irradiation, and the amount of the decomposition product in the orientation film is not less than 0.1 ng and not larger than 3957.5 ng, 1000.0 ng or less as another upper limit, and 500.0 ng or less as another upper limit.

By suitably selecting functionality required for the orientation film, the range of the optimum amount of the decomposition product can be selected.

Incidentally, the invention is not limited to the above structure and the structure disclosed in embodiments described later, and it is needless to say that with respect to all liquid crystal display devices including a so-called TN type, a so-called IPS type and a so-called VA type, various modifications can be made without departing from the technical concept of the invention.

According to the invention, it is possible to suitably inhibit adsorption of an ion in the liquid crystal to the polar portion of a film molecule of the orientation film (for example, the terminal of polyimide, the imide ring C=O of polyimide, a case where there is a substituent with a high polarity as a side chain of polyimide). By this, the degradation of afterimage characteristics due to DC by the adsorption of an ion impurity is suppressed, and a high-quality image display can be obtained.

DETAILED DESCRIPTION OF THE INVENTION

Hereinafter, specific embodiments of the invention will be described in detail with reference to the drawings of examples.

EXAMPLE 1

FIGS. 1A to 1D are explanatory views of typical structural formulae of short molecule components as decomposition products due to an orientation film resulting from a light orientation treatment in the invention. Here, although only the typical structures are shown, it is needless to say that the invention is not limited to these.

Incidentally, in FIG. 1, X denotes bonding of H, $CH_3$, $(CH_2)_n$—$CH_3$, $(CF_2)_n$—$CF_3$ or the like. Besides, $Y_1$ denotes bonding of H, $CH_3$ or one of materials shown in FIGS. 10A to 10E. Besides, $Y_2$ denotes bonding of one of materials shown in FIGS. 11A to 11E.

In this example, verification will be made on the influence, given to the function of the orientation film, of the residual amount of the decomposition product. Specifically, liquid crystal display (LCD) panels having orientation films of various conditions are produced by materials indicated below.

<Materials>
Condensation polymer of BAPP/CBDA (Mw=50000)
BAPP; 2,2-bith{4-(para-aminophenoxy)phenyl}propane
CBDA; 1,2,3,4-cyclobutanetetracarboxylic acid dianhydride <LCD Producing Method>

An orientation film is formed on each of a TFT substrate and an LCD substrate by spin-coat or a printing method, and is heated at 230° C. for about 2 hours by a clean oven. Although the thickness of the orientation film is made 100 nm here, there is no problem if it is about 20 to 200 nm necessary for providing orientation. An orientation control function is provided to the produced orientation film while conditions, such as the irradiation amount of light (integrated light amount), the presence of washing by pure water of semiconductor manufacture grade, and the presence of heating after light irradiation, are changed. Thereafter, the TFT substrate and the LCD substrate are bonded to each other and a liquid crystal is injected, so that the LCD is produced.

Incidentally, sample No. 1 of the integrated light amount of 0 is oriented by a rubbing treatment.

The above orientation film production conditions are shown in Table 1 below.

TABLE 1

| Sample No. | Integrated light amount J/cm | Presence of pure water washing | Heating after light irradiation |
|---|---|---|---|
| 1 | 0 | 25° C., 1 hour | NO |
| 2 | 1.5 | 25° C., 1 hour | 200° C., 2 hours |
| 3 | 1.5 | NO | 200° C., 2 hours |
| 4 | 3.0 | NO | 200° C., 2 hours |
| 5 | 10.0 | NO | 200° C., 2 hours |
| 6 | 1.5 | NO | NO |
| 7 | 3.0 | NO | NO |
| 8 | 6.0 | NO | NO |
| 9 | 10.0 | NO | NO |
| 10 | 15.0 | NO | NO |
| 11 | 20.0 | NO | NO |

<Verification of Orientation Film Function>

In this example, with respect to plural LCDs produced as stated above, the proper amount of decomposition product is verified from the viewpoint of a voltage holding ratio, an afterimage disappearance level, and reliability of an LCD cell.

<<Measuring Method of the Amount of Decomposition Product>>

Here, a measuring method of a decomposition product (low molecular weight component) remaining in the orientation film will be described.

FIG. 2, FIGS. 3A to 3C and FIGS. 4A to 4C are explanatory views of a procedure of taking a sample for measurement from a liquid crystal display panel. Here, a description will be made using a liquid crystal display panel constituting a TN type liquid crystal display device of an active matrix type as an example. Incidentally, the liquid crystal display device is constructed by incorporating a driving circuit and a display control device into the liquid crystal display panel. Incidentally, in the following, there is also a case where the liquid crystal display panel is simply called a panel.

Figure 1A:
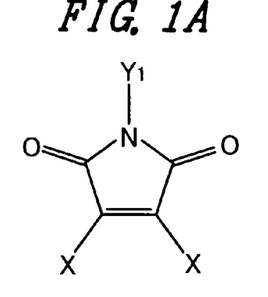
FIGS. 1A to 1D are explanatory views of typical structural formulae of decomposition products due to an orientation film resulting from a light orientation treatment in the invention.
Figure 1B:
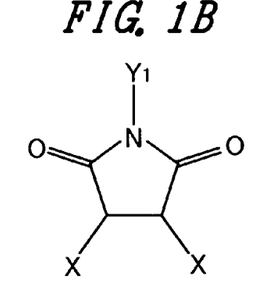
Figure 1C:
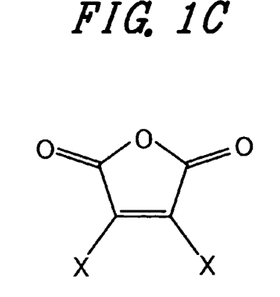
Figure 1D:
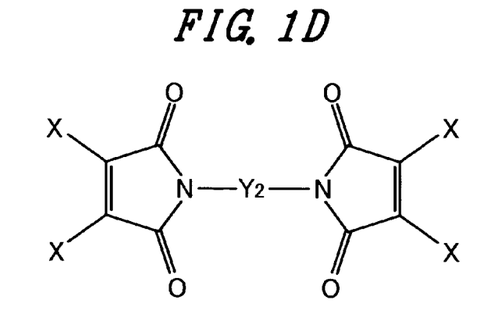
Figure 2:
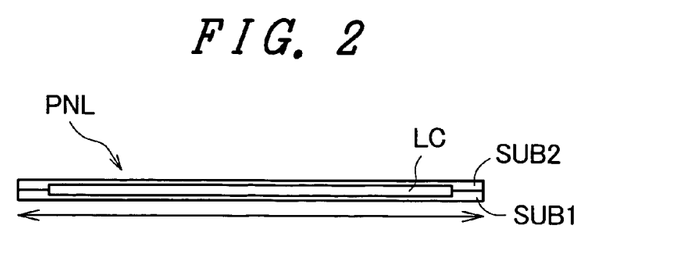
FIG. 2 is a sectional view for explaining a rough structure of a liquid crystal display panel.

FIG. 2 is a sectional view for explaining the schematic structure of the liquid crystal display panel. The liquid crystal display panel is constructed by sandwiching a liquid crystal LC between a thin film transistor substrate SUB1 as a first substrate and a color filter substrate SUB2 as a second substrate. Here, a sample is taken from the liquid crystal display panel with a short side length of 140 mm or more.

Figure 3A:
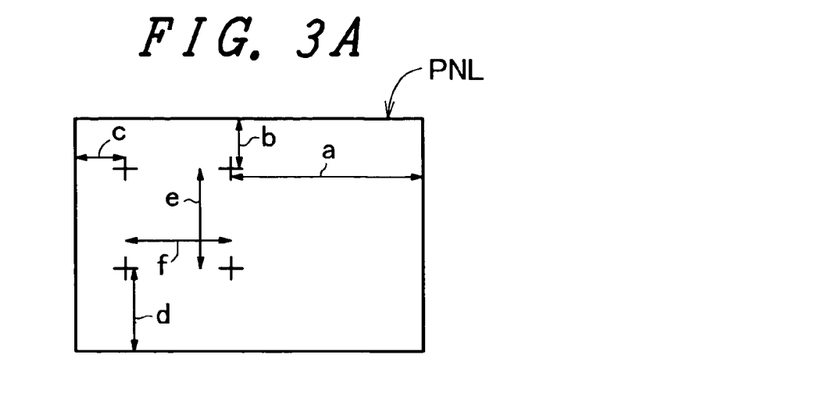
FIGS. 3A to 3C are process views for taking a sample from the liquid crystal display panel shown in FIG. 2.
Figure 3B:
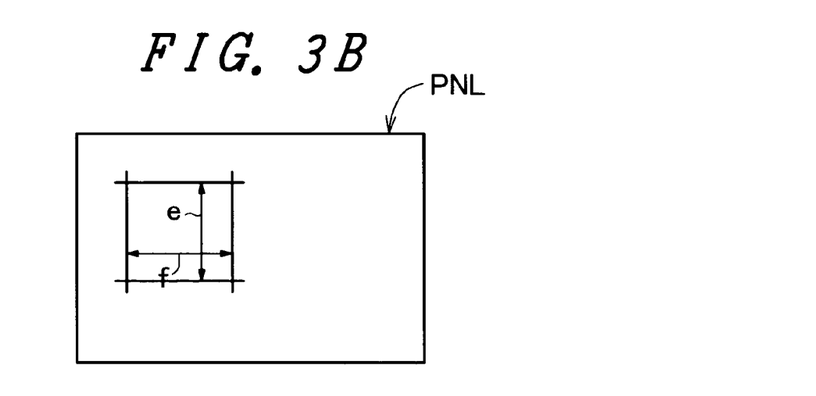
Figure 3C:
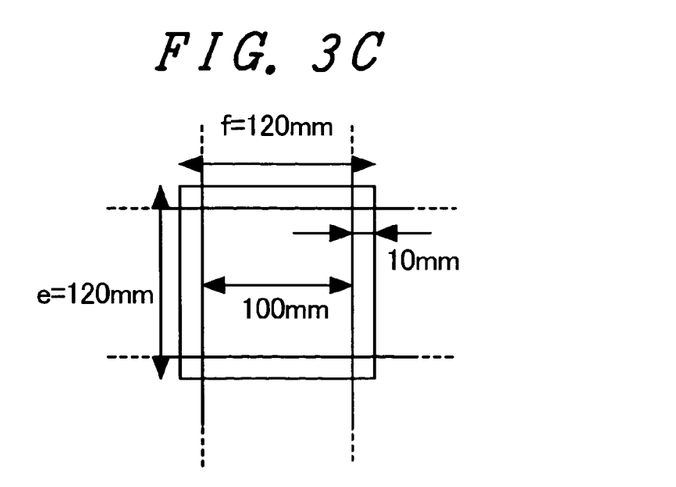

FIGS. 3A to 3C are process views for taking a sample from the liquid crystal display panel shown in FIG. 2. FIG. 3A shows a marking process, and the marking of "+" is performed at sites separated by distances a, b, c and d, each of which is 20 mm or more, from the ends of the panel toward the inside and at four corners of a square of e=120 mm×f=120 mm. A glass pen is used for this marking. At this time, the marking is performed on both surfaces at a place where both the surfaces of the thin film transistor substrate SUB1 side and the color filter substrate SUB2 side coincide with each other.

FIG. 3B shows a washing process. In this process, the surfaces of the square portion marked in FIG. 3A (both the surfaces of the thin film transistor substrate SUB1 side and the color filter substrate SUB2 side) are washed using an organic solvent such as acetone. The object of the washing is to prevent a contamination of the surface of the sample from being detected in an analysis to be performed thereafter. Thus, when the sample is touched, clean gloves used for semiconductor assembly or the like are worn. Besides, an unused clean paper with a size larger than the sample is placed on a stand (not shown) where the sample is to be placed, and the sample is placed on a source. The clean paper is exchanged each time the sample is turned inside out.

As an example of the washing method, new acetone with a purity of 99% or higher is applied onto an unused cloth, and the contamination of the surface of a desired area is wiped by the cloth. It is desirable that this work is repeated at least five times for each of the thin film transistor substrate SUB1 side and the color filter substrate SUB2 side.

FIG. 3C shows a cutting process of taking the sample from the panel. The panel is cut at portions located 10 mm inside the respective four sides of the washed square area of 120 mm×120 mm, and the square of 100 mm×100 mm is cut out. Also at this time, in order to prevent the contamination of the surface of the sample from being detected at a subsequent analysis, clean gloves used for semiconductor assembly or the like are worn. Besides, when cutting is performed, an unused clean paper with a size larger than the sample is placed on the stand (not shown) similarly to the above, and the sample is placed on the source.

Figures 4A, 4B:
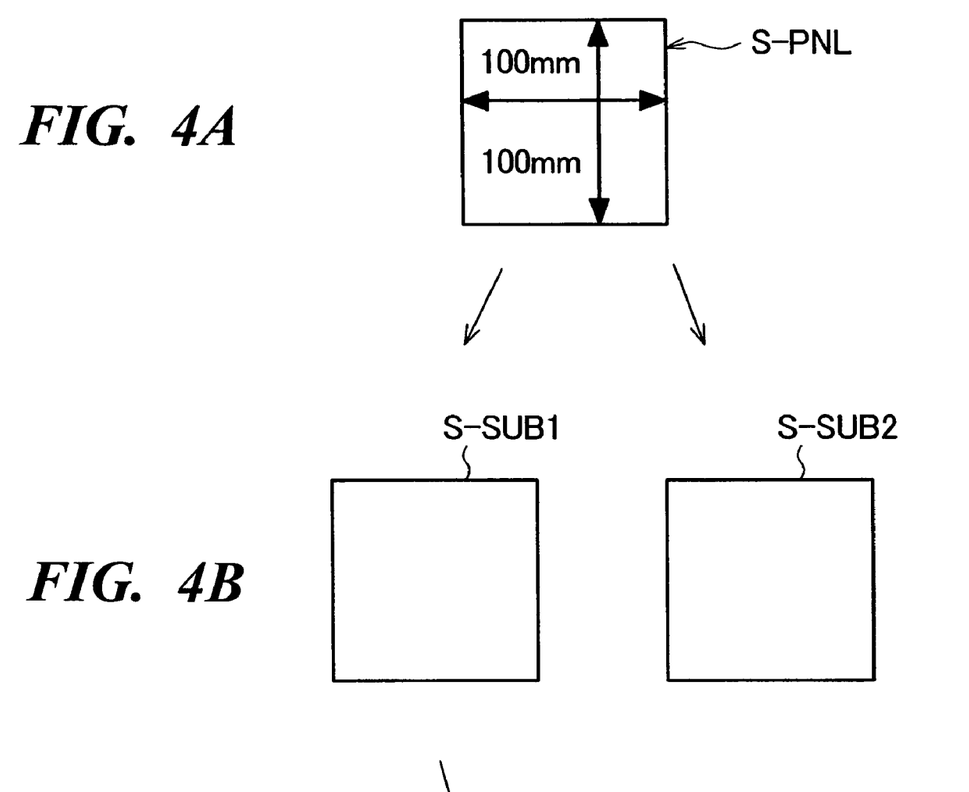
FIGS. 4A to 4C are process views subsequent to FIG. 3C for taking the sample from the liquid crystal display panel shown in FIG. 2.
Figure 4C:
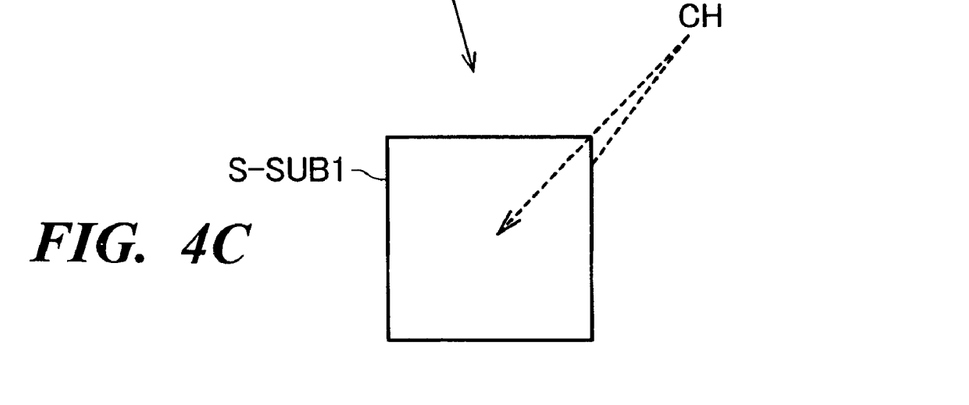

FIGS. 4A to 4C are process views subsequent to FIG. 3C for taking the sample from the liquid crystal display panel shown in FIG. 2. FIG. 4A shows a panel separation process and is a plan view of the sample washed in FIG. 3C. This sample is separated into the thin film transistor substrate SUB1 and the color filter substrate SUB2. At this separation, since the liquid crystal is sandwiched between both the substrates, for example, air is blown between both the substrates, and both the substrates are peeled off.

Also at this separation process, clean gloves used for semiconductor assembly or the like are worn. Besides, as in FIG. 4B, also when the separated both substrates (sample substrates S-SUB1 and S-SUB2 for analysis) are placed on the stand (not shown), an unused clean paper with a size larger than the sample is placed, and the substrates are placed thereon with the surfaces, which are the insides of the panel, facing upward. Incidentally, here, in the case where only the thin film transistor substrate side SUB1 is made the sample substrate S-SUB1 for analysis, the other sample substrate S-SUB2, which is the separated color filter substrate side, may be discarded. However, when it is assumed that the analysis of the orientation film is further performed, it is desirable to perform the same treatment as that of the sample substrate S-SUB1.

FIG. 4C shows a liquid crystal washing process, and a liquid crystal remaining and attached to the sample substrate SUB1 is removed. The sample substrate S-SUB1 is picked up with tweezers washed by acetone, cyclohexane CH with a purity of 99% or higher is directly poured on both sides of the sample substrate S-SUB1, and the liquid crystal is washed away. Thereafter, cyclohexane on the surface of the sample substrate is dried and removed by using high pressure air or the like. This work is repeated at least 10 times. Also at this liquid crystal washing process, clean gloves used for semiconductor assembly or the like are worn.

Also at the time when the sample substrate S-SUB1 after the liquid crystal washing process is placed on the not-shown stand, a similar clean paper is placed on the stand, and the surface of the thin film transistor pattern is turned up.

In the above, although the description has been given to the process for taking the sample from the liquid crystal display panel with the short side of 140 mm or more, in the case where the sample is taken from the liquid crystal display panel with the short side of less than 140 mm, sample cutting similar to the above is performed from plural panels, and the sum total of areas of sample substrates is made 100 mm$^2$. Alternatively, for example, in the case where only a sample of 25 mm$^2$ is prepared, the measured analysis result is converted in terms of 100 mm$^2$.

With respect to the sample taken in the manner as stated above, the amount of decomposition product (low molecular weight component) is measured.

Figure 5:
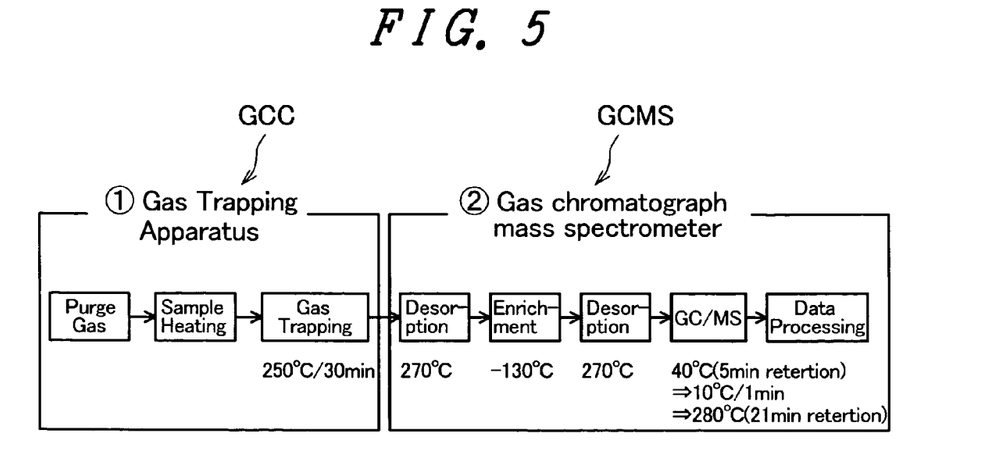
FIG. 5 is a view for explaining a measurement process of a measurement system of a low molecular weight component using a sample substrate of the invention.
Figure 6:
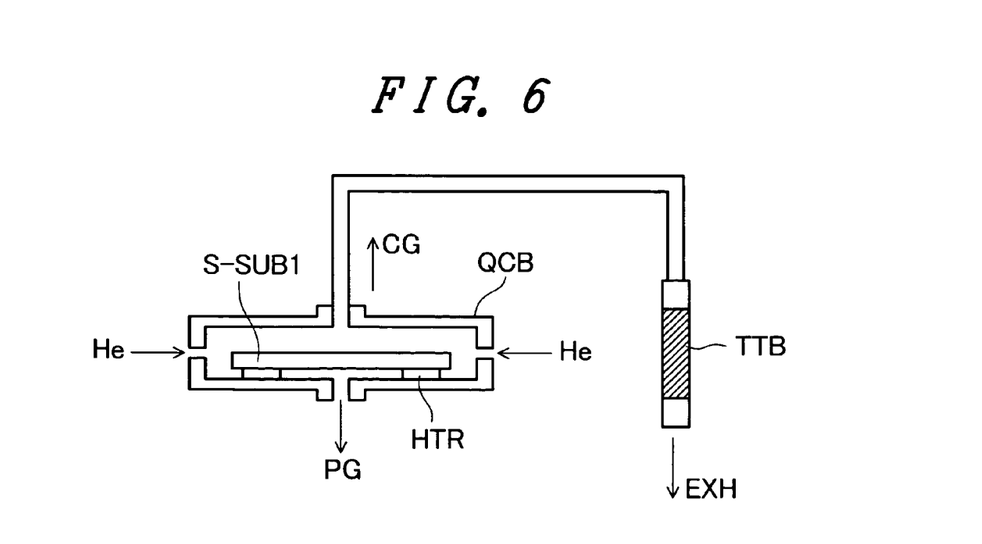
FIG. 6 is a structural view of a gas trapping apparatus in FIG. 5.

FIG. 5 is a view for explaining a measurement process of a measurement system of the amount of decomposition product using the sample substrate of the invention. This measurement system is constructed of a gas trapping apparatus GCC and a gas chromatograph mass spectrometer GCMS with a gas enrichment/introducing mechanism. FIG. 6 is a structural view of the gas trapping apparatus GCC in FIG. 5. The gas trapping apparatus GCC is "MSTD258MB" made by GL Sciences Inc., and the gas chromatograph mass spectrometer GCMS with the gas enrichment/introducing mechanism is "GC/MSQP-2010" made by Shimadzu Corporation.

In the gas trapping apparatus GCC in FIG. 5, the sample substrate S-SUB1 is inserted in a quartz chamber QCB shown in FIG. 6, a helium gas He is introduced as a purge gas, and while purging is performed from the back of the sample, heating is performed by a heating mechanism HTR at 250° C. for 30 minutes. During this, the gas in the quartz chamber QCB is collected as a collected gas CG, and this is inserted from one end of a trap tube TTB.

The trap tube TTB is a glass tube, resin for trapping (heat resistant resin of 2,6-diphenylene oxide structure) is filled therein, and exhaustion is performed from the other end by a pump or the like, so that the collected gas CG is made to pass through. During this passage, a component contained in the collected gas CG is adsorbed in the trap tube TTB. This trap tube TTB is taken off and is set in the gas chromatograph mass spectrometer GCMS with the gas enrichment/introducing mechanism in FIG. 5.

The trap tube TTB set in the gas enrichment/introducing mechanism of the gas chromatograph mass spectrometer GCMS in FIG. 5 is heated to 270° C., and then is cooled to −130° C., and is again heated to 270° C., and by the treatment, the component adsorbed in the trap tube TTB is enriched. The trap tube TTB after the enrichment is taken off from the gas enrichment/introducing mechanism, and is set in the gas chromatography mass spectrometer GCMS. In the gas chromatograph mass spectrometer GCMS, heating is performed up to 40° C. and is held for 5 minutes. Thereafter, heating is performed at 10° C. for 1 minute, and is further held at 280° C. for 21 minutes. The component is analyzed by this treatment, and a chromatogram is obtained.

Figure 12:
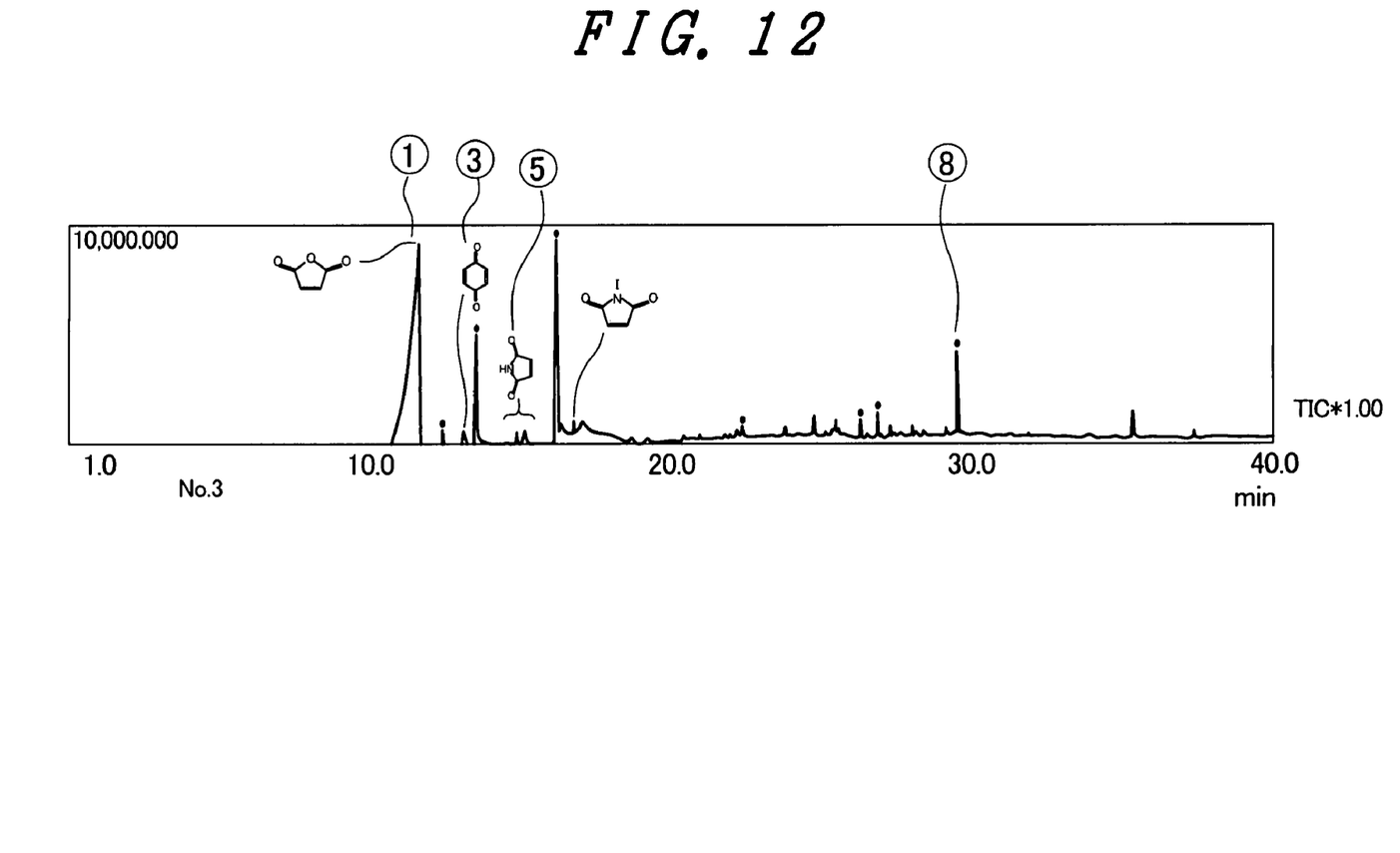
FIG. 12 shows an example of a GC chromatogram.

An example of the obtained chromatogram is shown in FIG. 12. FIG. 12 shows an example of the GC chromatogram. Although not shown, an MS spectrum is obtained for each chromatogram peak, and identification is performed.

An example obtained by this analysis result is shown in Table 2 below.

TABLE 2

| Peak No. | Material name | Kind | Peak area Sample substrate A | C16 peak area intensity | $C_{16}$ injection amount (ng) | $C_{18}$ converted value (ng/substrate) sample substrate A |
|---|---|---|---|---|---|---|
| 1 | product a | decomposition product | 203224574 | 17268643 | 40 | 470.7 |
| 2 | PGMEA | solvent | 928129 | 17268643 | 40 | 2.1 |
| 3 | product b | decomposition product | 2117271 | 17268643 | 40 | 4.9 |
| 4 | butyl cellosolve | solvent | 21650766 | 17268643 | 40 | 50.2 |
| 5 | product c | product | 3197041 | 17268643 | 40 | 7.4 |
| 6 | NMP | solvent | 52758989 | 17268643 | 40 | 122.2 |
| 7 | product d | decomposition product | 1196929 | 17268643 | 40 | 2.8 |
| 8 | DIBA | environmental material | 1685491 | 17268643 | 40 | 3.9 |
| 9 | DBP | environmental material | 8572317 | 17268643 | 40 | 19.9 |
| | decomposition product a + b + c + d | | | | | 485.8 |
| | others | | | | | 198.3 |

As shown above, with respect to the respective samples, the peak areas of the decomposition products are summed, and based on the reference material $C_{16}$, the amount of the decomposition product in the orientation film is calculated. The above table shows that the decomposition product of 485.8 ng is detected.

<<Measuring Method of Voltage Holding Ratio (VHR)>>

The voltage holding ratio is an index to indicate the degree of a voltage drop when a circuit is brought into a discharge state after a voltage is first applied between electrodes of a liquid crystal cell to form a completely charged state.

Figure 13:
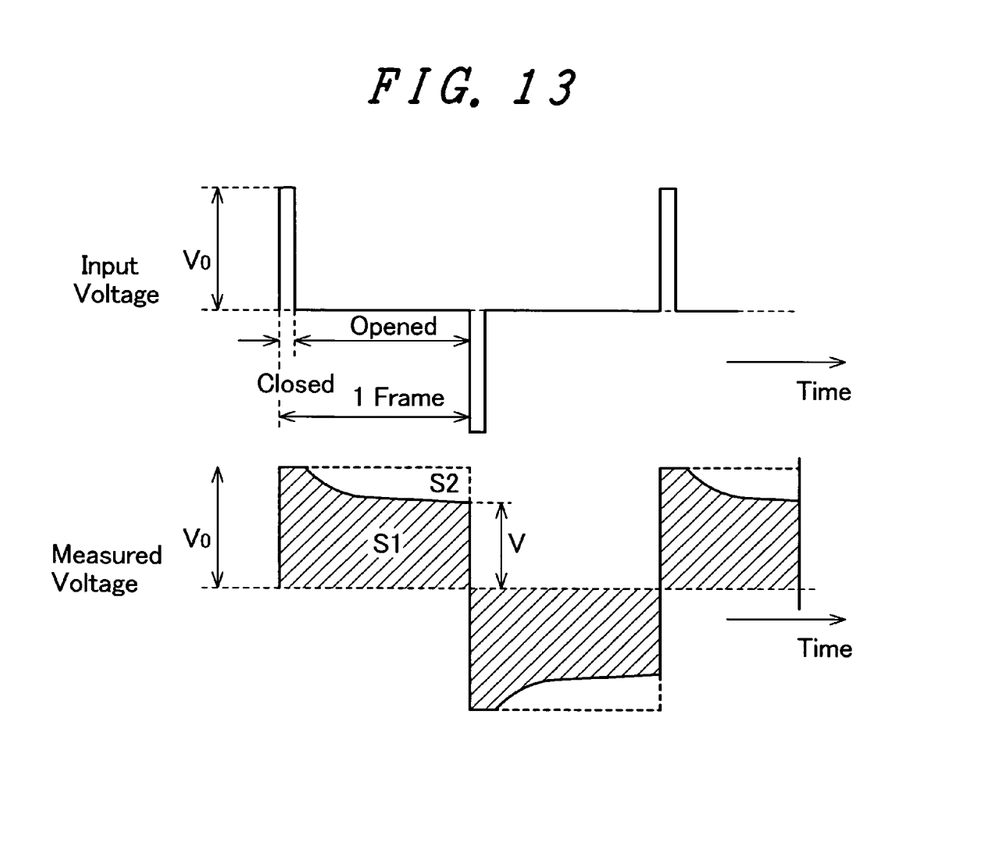
FIG. 13 is a view for explaining a voltage holding ratio.

FIG. 13 shows a relation between a drive voltage V0 applied to the liquid crystal cell and an inter-electrode potential V. In this drawing, VHR denotes a ratio at which an electric charge charged during one frame period is held (area ratio), and is defined by a following expression (1).

$$VHR = S1/(S1+S2) \quad (1)$$

Such a voltage that the TFT element of the LCD as an evaluation object is always turned ON (for example, 18 V between the gate and common) is applied. As a voltage between the drain and common, a specified voltage is applied only in a specific time for each frame, and in the other period, the TFT element is disconnected from the drain-common drive circuit and is brought into an open circuit state. The potential between the electrodes at this time is monitored.

Measurement conditions here are as follows:
gate-common voltage: 18 V (DC)
drain-common frame frequency (set value): 3 Hz
drain-common voltage application time (set value): 0.0267 s
drain-common voltage (set value): 4V
measurement temperature: 25° C.

<<Verification of Afterimage Disappearance Level>>

The afterimage disappearance level is verified as described below.

(A) Evaluation Method

A pattern in which a screen is divided into 16 white and black parts like a checker flag is displayed. The state is held for 2 minutes. A time when the checker flag pattern disappears at a halftone is measured.

(B) Evaluation Reference
level 3: not disappear in 1 minute.
level 2: disappear in 1 minute.
level 1: Although an afterimage appears, it disappears in 2 or 3 seconds.
level 0: An afterimage does not appear.

<<Verification of LCD Cell Reliability>>

The LCD cell reliability is classified into levels as follows:
level 1: When a black screen is called up after the LCD cell is left at a high temperature of 100° C. for 1000 hours, a blur appears.
level 0: Even after the LCD cell is left at a high temperature of 100° C. for 1000 hours, a defect does not appear on the display.

<Verification Result>

The results obtain by analyzing the samples of Table 1 along various verification methods as stated above are shown in Table 3 below.

TABLE 3

| Sample No. | Detection amount of decomposition product in substrate 100 mm square (ng) | Voltage holding ratio (%) | Afterimage disappearance level | Reliability of LCD cell |
|---|---|---|---|---|
| 1 | 0 | 96.3 | 3 | 0 |
| 2 | 4.8 | 96.3 | 0 | 0 |
| 3 | 26.1 | 96.3 | 0 | 0 |
| 4 | 44.3 | 96.4 | 0 | 0 |
| 5 | 349.7 | 96.3 | 0 | 0 |
| 6 | 485.8 | 96.4 | 0 | 0 |
| 7 | 781.2 | 96.2 | 1 | 0 |
| 8 | 1101.5 | 96.0 | 1 | 0 |
| 9 | 2437.7 | 94.6 | 2 | 0 |
| 10 | 3158.5 | 93.3 | 2 | 0 |
| 11 | 3957.5 | 91.5 | 3 | 1 |

When the amount of decomposition product due to the orientation film resulting from the light orientation treatment is large, the properties as polyimide are remarkably lowered, and the heat stability and electric stability as merits of polyimide are lowered. In Table 3, with respective to the reliability of the LCD cell, a blur appears in sample No. 11 and the level becomes level 1. Accordingly, from the viewpoint of the LCD reliability, it can be said to be desirable that the amount of decomposition product is 3957.5 ng or less, and is preferably 3500.0 ng or less.

Figure 14:
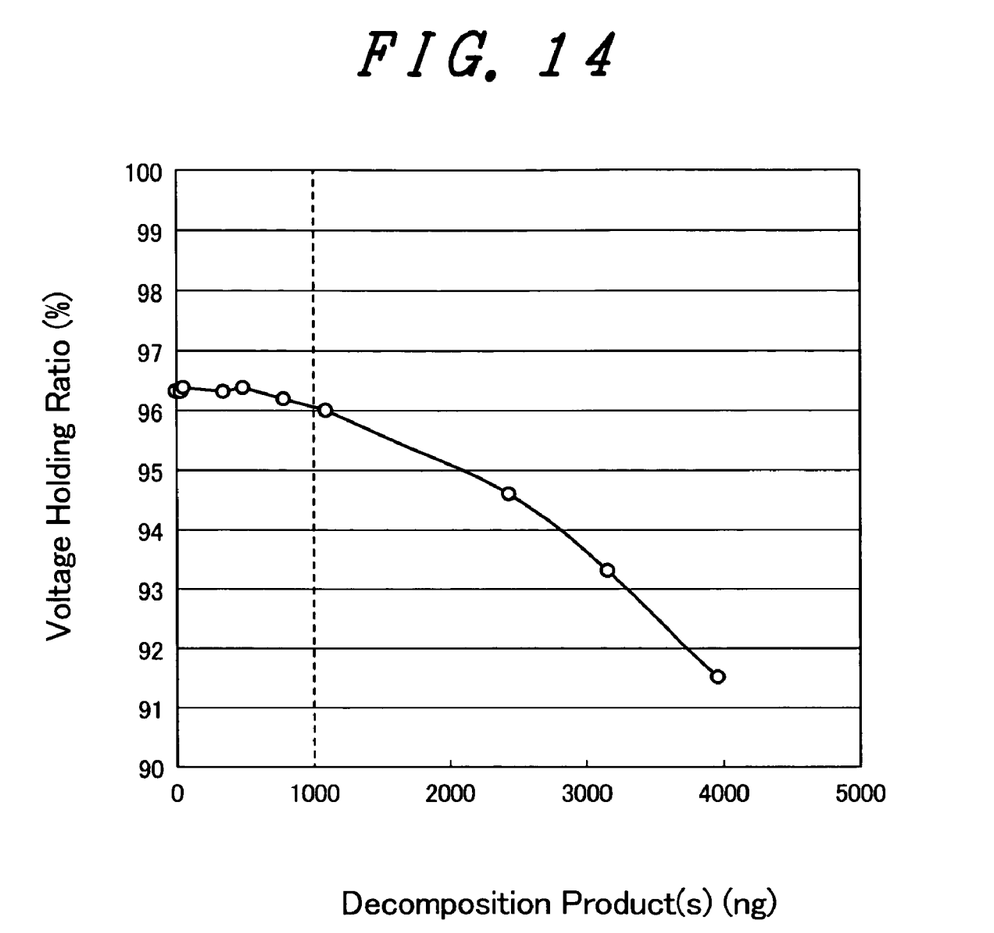
FIG. 14 is a view showing a relation between a voltage holding ratio and the amount of decomposition product.

Besides, FIG. 14 shows a relation between the amount of decomposition product and the voltage holding ratio obtained from the above analysis results. There is a high possibility that a low molecular weight component of the decomposition product dissolves in the liquid crystal, and the voltage holding ratio (orientation holding ratio) is lowered. In the graph of FIG. 14, when the amount of decomposition product is 1000 ng or more, the tendency of the lowering is remarkable. When consideration is given to this, it is desirable that the amount of decomposition product is 1000.0 ng or less.

Further, since the presence of the low molecular weight component lowers the elastic modulus of the surface of the orientation film, it is desirable that the residual amount is less. However, when a small amount of low molecular weight component exists, an ionic impurity in the liquid crystal is not absorbed to the surface of the orientation film, but is trapped by the low molecular weight component, and the after image characteristic due to DC is improved. As a result of the afterimage disappearance level verification in Table 3, it is understood that the afterimage does not disappear in sample No. 1 of the residual amount of 0. Incidentally, as the lower limit value of the amount of decomposition product, since it is conceivable that there is an effect of afterimage disappearance when the decomposition product exists even if only slightly, it is conceivable to be effective when the amount is 0.1 ng or more.

Besides, in sample No. 2 to No. 6, the afterimage does not appear, and the afterimage appears in samples after sample No. 7. As the upper limit value of the amount of decomposition product, when the residual amount is between sample No. 6 and No. 7, that is, when it is 500.0 ng or less, it is conceivable to be effective.

Thus, from the viewpoint of the afterimage disappearance, the amount of decomposition product is 0.1 ng or more and 500.0 ng or less, and from the viewpoint that the afterimage is not generated at all, it is desirable that the amount is 4.8 ng or more and 485.8 ng or less.

By this analysis, from the viewpoint of the voltage holding ratio, the afterimage disappearance level, and the reliability of the LCD cell, the optimum amount of the decomposition product can be verified.

Besides, the production of the orientation film having the optimum amount of the decomposition product can be realized by referring to Table 1.

<Whole Structure of LCD>

Figure 7:
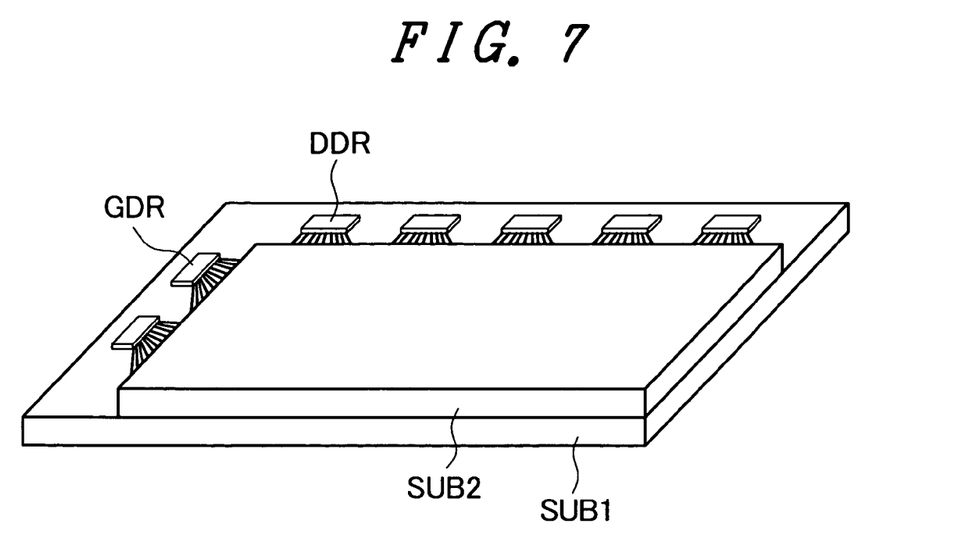
FIG. 7 is a perspective view schematically showing the outer appearance of a liquid crystal display panel constituting a liquid crystal display device of the invention.

FIG. 7 is a perspective view schematically showing the outer appearance of a liquid crystal display panel constituting a liquid crystal display device of the invention. In this liquid crystal display panel, a thin film transistor (TFT) substrate SUB1 and a color filter (CF) substrate SUB2 are bonded to each other and a liquid crystal is sealed in a bonding gap of both the substrates. Two sides of the TFT substrate SUB1 protrude from two corresponding sides of the CF substrate SUB2, and a gate driver GDR as a scanning signal line driving circuit chip is mounted on the protruding short side, and a drain driver DDR as a display signal line driving circuit chip is mounted on the long side. Although FIG. 1 shows two gate drivers GDR and five drain drivers DDR, this is schematic, and the number of the respective drivers is determined by the size, fineness, and the like of the liquid crystal display panel.

Figure 8:
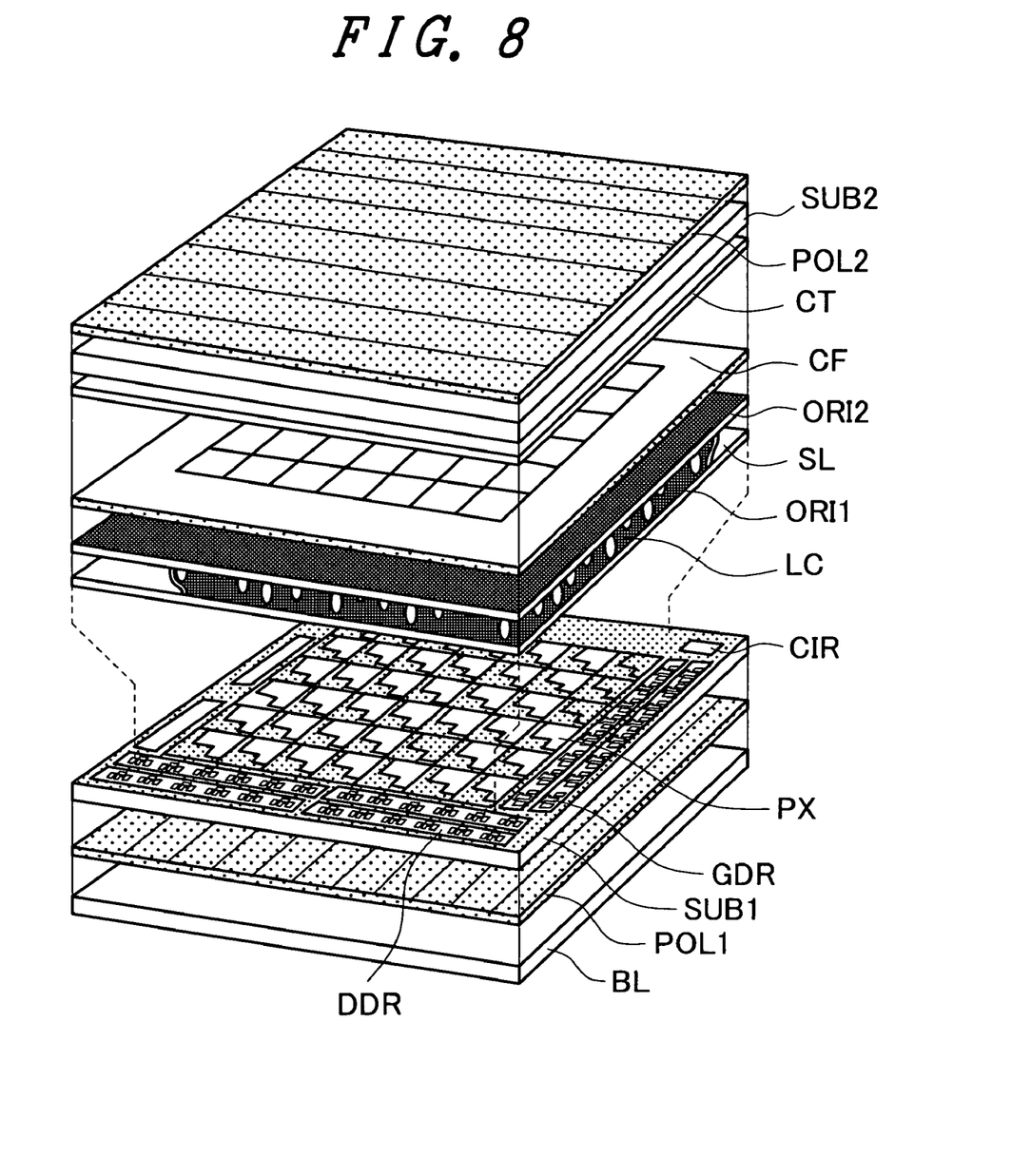
FIG. 8 is a developed perspective view for schematically explaining a structural example of the whole liquid crystal display panel constituting the liquid crystal display device of the invention.

FIG. 8 is a developed perspective view for schematically explaining an structural example of the whole liquid crystal display device. In FIG. 8, the so-called vertical electric field type (TN type) liquid crystal display panel is used. Incidentally, in FIG. 8, although a TFT substrate SUB1 and a CF substrate SUB2 have the same size, actually, as explained in FIG. 7, the TFT substrate SUB1 protrudes from the CF substrate SUB2. This is indicated by vertical dotted lines in FIG. 8. Pixel electrodes PX constituting many pixels of a matrix array using thin film transistors as active elements, a gate driver GDR mounted around a matrix array region (display region) of the pixels, a drain driver DDR and an attached circuit CIR are formed on the main surface of the TFT substrate SUB1. A TFT substrate side orientation film ORI1 is formed to cover the outermost surface including this display region.

An opposite electrode (also called a common electrode in this system) CT and a color filter CF are formed on the main surface of the CF substrate SUB2, and a CF substrate side orientation film ORI2 is formed to cover the outermost surface including a region corresponding to the display region.

A liquid crystal LC is sealed between the orientation film ORI1 of the TFT substrate SUB1 and the orientation film ORI2 of the CF substrate SUB2, and is sealed by a seal SL.

Incidentally, polarizing plates POL1 and POL2 are respectively stacked on the outer surface of the TFT substrate SUB1 and the outer surface of the CF substrate SUB2. This liquid crystal display device is of a transmission type, and a backlight BL is installed on the back of the TFT substrate SUB1.

<Processing Apparatus of Light Orientation>

Figure 9:
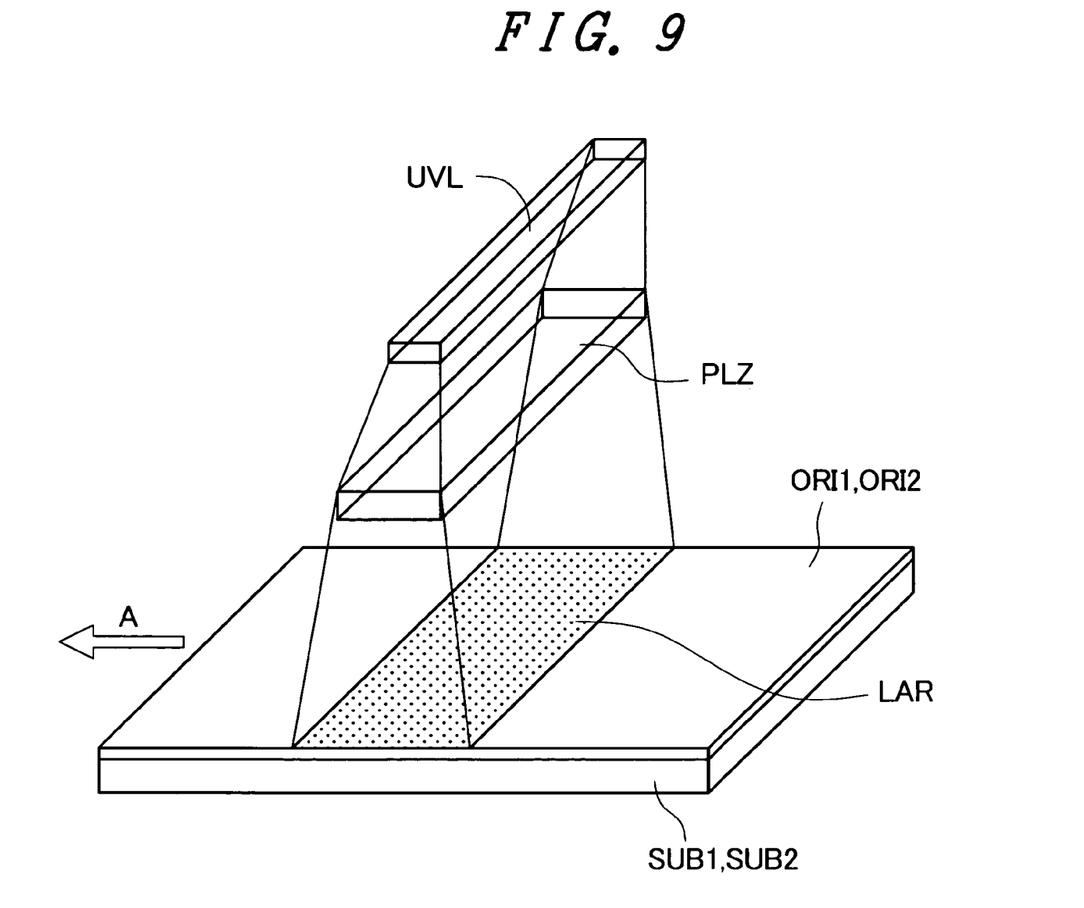
FIG. 9 is a view for schematically explaining a processing apparatus of light orientation.
Figure 10A:
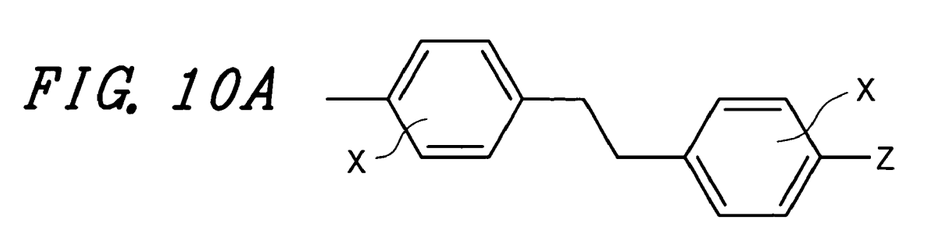
FIGS. 10A to 10E are views showing structural formulae of materials bonded to Y1 of a decomposition product.
Figure 10B:
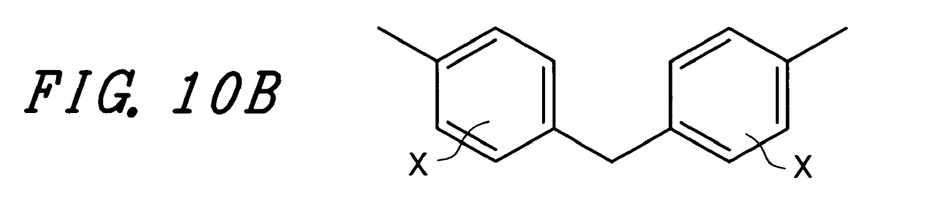
Figure 10C:
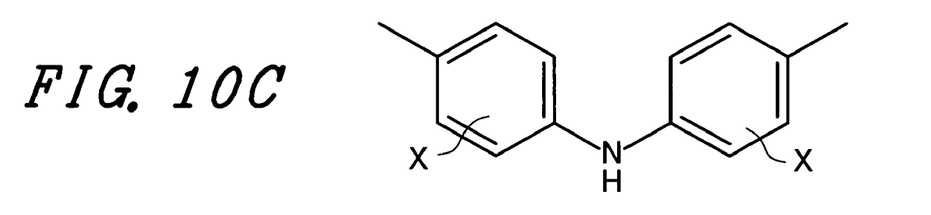
Figure 10D:
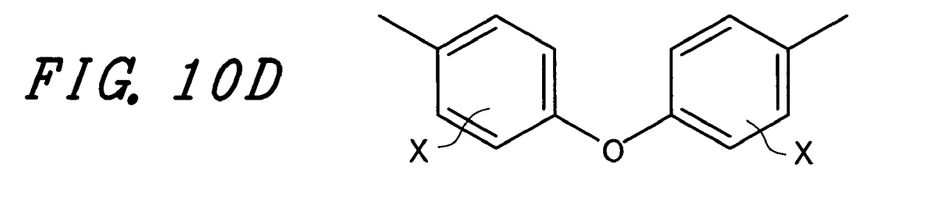
Figure 10E:
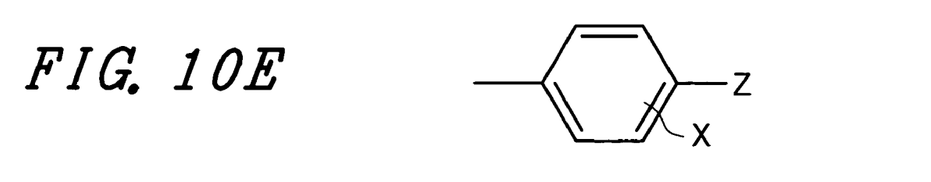
Figure 11A:
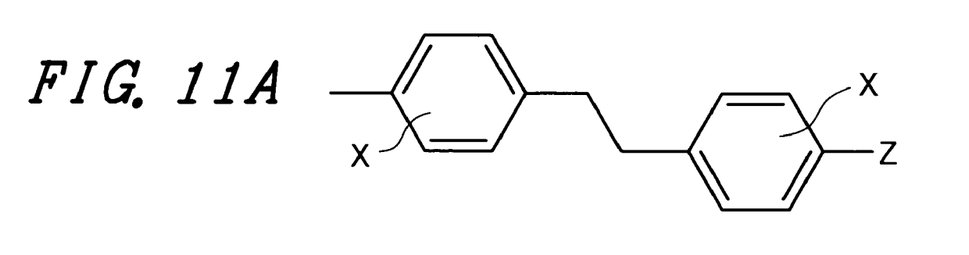
FIG. 11 is a view showing structural formulae of materials bonded to Y2 of a decomposition product.
Figure 11B:
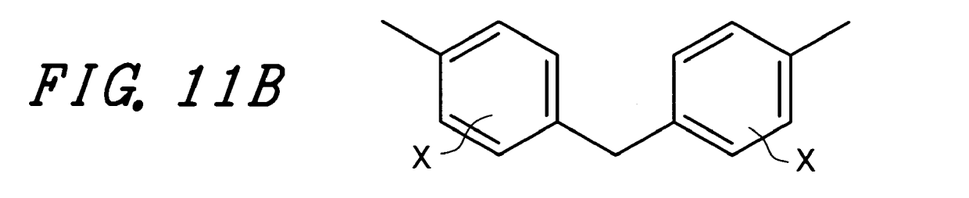
Figure 11C:
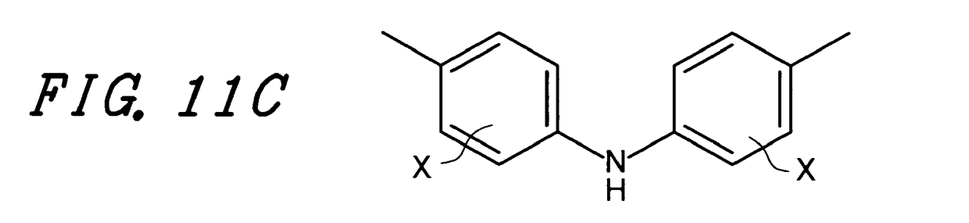
Figure 11D:
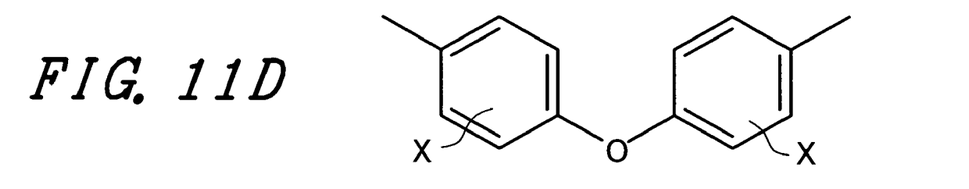
Figure 11E:
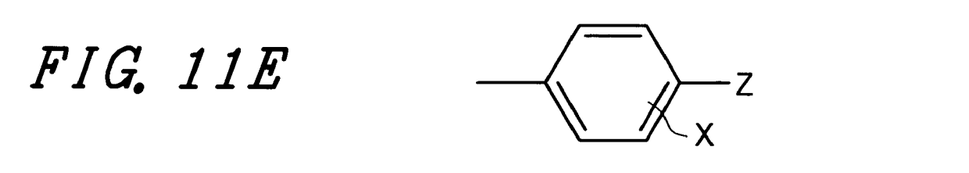

FIG. 9 is an explanatory view for schematically explaining a processing apparatus of light orientation. The orientation film ORI1 or ORI2 to which the orientation control function has not been provided is formed on the main surface of the TFT substrate SUB1 or the CF substrate SUB2. An ultraviolet lamp UVL is used as a light source. Only a specified polarization component is selected from the ultraviolet rays from the ultraviolet lamp UVL by a polarizer PLZ, and is irradiated to the orientation film ORI1 or ORI2 formed on the TFT substrate SUB1 or the CF substrate SUB2. The TFT substrate SUB1 or the CF substrate SUB2 is moved in an arrow A direction, and the orientation control function is provided to the orientation film of the whole region of the substrate. Incidentally, the movement of the substrate with respect to the light source is relative, and the light source side may be moved, or both the light source and the substrate may be moved.

What is claimed is:

1. A liquid crystal display device comprising:
  a first substrate having a first orientation film on an uppermost layer of the substrate on which an active element for pixel selection is formed;
  a second substrate having a second orientation film on an uppermost layer of the substrate on which a color filter is formed; and
  a liquid crystal sealed between the first orientation film and the second orientation film, wherein
  both the first orientation film and the second orientation film are provided with a liquid crystal orientation function by light irradiation, and
  the orientation film provided with the liquid crystal orientation function contains a short molecule component due to the orientation film.

2. The liquid crystal display device according to claim 1, wherein the short molecule component is a decomposition product of the orientation film generated by the light irradiation.

3. The liquid crystal display device according to claim 2, wherein a residual amount of the decomposition product is 3957.5 ng or less per 100 cm$^2$.

4. The liquid crystal display device according to claim 3, wherein the residual amount of the decomposition product is 3500.0 ng or less per 100 cm$^2$.

5. The liquid crystal display device according to claim 4, wherein the residual amount of the decomposition product is 1000.0 ng or less per 100 cm$^2$.

6. The liquid crystal display device according to claim 5, wherein the residual amount of the decomposition product is 500.0 ng or less per 100 cm$^2$.

7. The liquid crystal display device according to claim 6, wherein the residual amount of the decomposition product is 0.1 ng or more per 100 cm$^2$.

8. The liquid crystal display device according to claim 7, wherein the residual amount of the decomposition product is 4.8 ng or more and 465.8 ng or less per 100 cm$^2$.

9. The liquid crystal display device according to claim 2, wherein at a time of formation of the orientation film, an integrated light amount of 1.5 to 10.0 J/cm$^2$ is given, and then, the orientation film is heated.

\* \* \* \* \*